United States Patent [19]
Phelps

[11] Patent Number: 5,649,675
[45] Date of Patent: Jul. 22, 1997

[54] FISHING ROD EYELET WRAPPING DEVICE

[76] Inventor: Don R. Phelps, 1514 Roosevelt, Joplin, Mo. 64801

[21] Appl. No.: 505,684

[22] Filed: Jul. 21, 1995

[51] Int. Cl.$^6$ .............................. B65H 39/16; H01G 7/00
[52] U.S. Cl. ............................. 242/441.2; 242/448.1; 29/564.6
[58] Field of Search ..................... 242/440.1, 441, 242/441.2, 448.1, 7.21; 29/428, 433, 779, 780, 782, 33 K, 564.6, 564.7

[56] References Cited

U.S. PATENT DOCUMENTS

| 1,412,747 | 4/1922 | Hull | 242/440.1 X |
|---|---|---|---|
| 2,218,995 | 10/1940 | Torrence | 242/444 |
| 2,550,131 | 4/1951 | Wodetzky | 242/444 |
| 2,556,827 | 6/1951 | Striano | 242/447.3 |
| 2,609,155 | 9/1952 | Fosnaugh | 242/448.1 |
| 2,640,653 | 6/1953 | Wodetzky | 242/444 |
| 2,989,255 | 6/1961 | Smith, Jr. | 242/422.4 |
| 3,448,506 | 6/1969 | Bishop et al. | 29/208 |
| 3,507,137 | 4/1970 | Taleff et al. | 242/441 X |
| 3,651,561 | 3/1972 | Cousin | 29/450 |
| 3,672,026 | 6/1972 | Cutler et al. | 242/440.1 X |
| 3,730,448 | 5/1973 | Schippers et al. | 242/43.1 |
| 4,279,684 | 7/1981 | Mason | 156/425 |
| 4,315,606 | 2/1982 | Seiders | 242/447.1 |
| 4,442,981 | 4/1984 | Cope | 242/448.1 |
| 4,691,874 | 9/1987 | Inamori et al. | 242/362.1 |
| 4,771,957 | 9/1988 | Schlake et al. | 242/441.1 X |
| 5,054,196 | 10/1991 | Sakaya et al. | 29/428 X |
| 5,314,565 | 5/1994 | Moore | 242/441.1 X |

FOREIGN PATENT DOCUMENTS

387798  2/1933  United Kingdom ............... 242/7.21

Primary Examiner—Daniel P. Stodola
Assistant Examiner—Emmanuel M. Marcelo
Attorney, Agent, or Firm—Richard L. Miller P.E.

[57] ABSTRACT

A winding device for a fishing rod that is computerized and automatically winds multiple portions of the same fishing rod simultaneously. The fishing rod wrapping device includes a frame, a table, a winder arrangement, a rod clamp arrangement, a blocker arrangement, a plier arrangement, a cutter arrangement, a needle arrangement, and a micro programmable controller. The frame has a frame top, a frame bottom, and a frame track with a frame track longitudinal axis. The table is movably mounted to the frame track. The winder arrangement is mounted to the table. The rod clamp arrangement is mounted to the table and is disposed behind the winder arrangement. The blocker arrangement is mounted to the table and is disposed behind the winder arrangement. The plier arrangement is mounted to the table and is disposed in front of the winder arrangement. The cutter arrangement is mounted to the table and is disposed in front of the winder arrangement. The needle arrangement is mounted to the winder arrangement and is passable through the winder arrangement. The micro programmable controller is disposed within the frame.

40 Claims, 6 Drawing Sheets

FISHING ROD EYELET WRAPPING DEVICE

BACKGROUND OF THE INVENTION

The present invention relates to a winding device for a fishing rod. More particularly, the present invention relates to a winding device for a fishing rod that is computerized and automatically winds multiple portions of the same fishing rod, simultaneously.

It is common place to employ guide eyelets to a fishing rod for the purpose of guiding the fishing line along the length of the rod. These guide eyelets are usually provided with semicircular bases which embrace the rod and are secured thereto by thread wrapped securely about both.

It would of course be possible for a person with a sufficiently high skill and dexterity to perform the entire wrapping function manually, with no tools or apparatus other than a spool of wrapping thread, by applying the following procedure.

The initial portion of the wrapping thread is wrapped around the fishing rod at the position adjacent to where the eyelet base is to be placed. The eyelet base is then positioned on the fishing rod and subsequent thereto a separate piece of looped wrapping thread is positioned adjacent to the fishing rod in the area of the eyelet base.

The remaining portion of the wrapping thread is then wrapped around both the positioned eyelet base and the separate looped piece of wrapping thread. The end of the remaining portion of the wrapping thread is slid through the loop of the separate looped piece of wrapping thread. The separate looped piece of wrapping thread is then moved in the direction opposite to where the eyelet is positioned. This movement causes the separate looped piece of wrapping thread to escape from the remaining portion of the wrapping thread while pulling the end of the remaining portion of the wrapping thread between the fishing rod and the remaining portion of the wrapping thread.

The end of the remaining portion of the wrapping thread is then removed from the separate looped piece of wrapping thread and pulled to securely fasten the eyelet to the fishing rod.

However, such a manual operation is subject to many difficulties, for example, the need for the separate looped wrapping thread, the maintenance of an even tension on the thread as it is wrapped around the rod, and the maintenance of a uniform angle of approach of the thread to the rod during wrapping. All of which are essential to a neat and attractive appearance of the finished job.

In my copending application entitled FISHING ROD WRAPPING DEVICE NEEDLE, filed on or about Jun. 6, 1995, I teach a simply configured needle that eliminates the need for the separate looped piece of wrapping thread during the wrapping operation.

Briefly stated, and with reference to FIGS. 1–7 and 9 and 10, the fishing rod wrapping device needle is shown generally at 1 and includes a body portion 2, a jaw blade major projection 3, a jaw blade major projection paw 4, a jaw blade minor projection 5, and a jaw blade minor projection paw 6.

The jaw blade major projection 3 extends smoothly from and is collinear with the body portion 2. The jaw blade major projection 3 has a jaw blade major projection inner surface 3A with a jaw blade major projection inner surface intermediate position 3AA. The jaw blade minor projection 5 extends smoothly from and is collinear with the body portion 2. The jaw blade minor projection 5 has a jaw blade minor projection inner surface 5A with a jaw blade minor projection inner surface intermediate position 5AA. The jaw blade minor projection 5 is disposed a distance frown and substantially parallel to the jaw blade major projection 3 and defines a jaw blade slot 7 therebetween. The jaw blade mayor projection paw 4 is disposed on and projects outwardly from the jaw blade major projection inner surface intermediated position 3AA. The jaw blade minor projection paw 6 is disposed on and projects outwardly from the jaw blade minor projection inner surface intermediate position 5AA and towards the jaw blade major projection paw 4. The jaw blade major projection 3 and the jaw blade minor projection 5 are reversely movable from a first position where the jaw blade minor projection paw 6 contacts the jaw blade major projection paw 5 to a second position where the jaw blade minor projection paw 6 does not contact the jaw blade major projection paw 4.

In operation, as shown in FIGS. 1, 1A, 9, and 10, the fishing rod wrapping device needle 1 is cooperating with a fishing pole 14 to secure the wrapping thread 25, that has been applied thereto. In FIG. 2, the fishing rod wrapping device needle 1 is shown in greater detail. In FIG. 4, the wrapping thread 25 is about to be drawn through the jaws into the needle eye 8. In FIGS. 3, 6 and 7, the wrapping thread 25 is being drawn through the jaws into the eye 8 of the fishing rod wrapping device needle 1. In FIG. 5, the fishing rod wrapping device needle 1 has secured the eyelet 15 and the wrapping thread 25 to the fishing pole.

Numerous innovations for fishing rod wrapping devices have been provided in the prior art that will be described. However, even though these innovations may be suitable for the specific individual purposes to which they address, they differ from the present invention, in that they do not provide a winding device for a fishing rod that is computerized and automatically winds multiple portions of the same fishing rod, simultaneously.

For example, U.S. Pat. No. 2,218,995 to Torrence teaches a fishing rod winding machine that prevents the whipping and wobbling of the rod during rotation by use of a pair of spaced apart aligned chucks that are rotated simultaneously and opened/closed simultaneously.

Another example, U.S. Pat. Nos. 2,550,131 and 2,640,653 both to Wodetzky teach a rod winding machine that is mounted on a base plate supported by legs and includes an expansible chuck, a winding head with duplex winding sections, and a driving mechanism.

Still another example, U.S. Pat. No. 2,556,827 to Striano teaches a fishing rod wrapping machine that includes a "U"-shaped frame with end walls, a pair of rollers journaled within the frame, reinforcing flanges inturned from the end walls, a carriage, a spindle mounted on the carriage, a bobbin mounted on the spindle, a guide element mounted on the carriage, and tension means on the carriage.

Yet another, U.S. Pat. No. 2,609,155 to Fosnaugh teaches a fishing rod wrapping device that includes a plurality of spaced apart members mounted upon a base and provided with resilient clamping means and bearings.

Still yet another example, U.S. Pat. No. 2,989,255 to Smith Jr. teaches a fishing rod wrapping device that includes a base, a pair of upright supports rising from the base, a horizontal support rod extending through the supports, break means for retarding rotation of a spool loaded on the support rod, and mounting means for mounting the break means.

Yet still another example, U.S. Pat. No. 3,448,506 to Bishop et al. teaches a rod wrapping machine that has a rotating circular head with a sector-like opening and dual drive means to bridge the opening.

Still yet another example, U.S. Pat. No. 3,651,561 to Cousin teaches a method for assembling a line guide to a fishing rod that includes a pair of relatively movable fixtures having die cavities adapted to receive an assembly of helical wire coils that move longitudinally and a line guide in such position that the legs of the line guide are fitted into the coils.

Yet still another example, U.S. Pat. No. 3,730,448 to Schippers et al. teaches a winding machine that includes a transversing yarn guide embodying a toggle lever having one arm slidably guided in a pivotable guide rail, and clutch means that connect the guide rail and the adjusting members.

Still yet another example, U.S. Pat. No. 4,279,684 to Mason teaches an apparatus for applying and wrapping guide line to a fishing rod that includes a stable bed characterized by three guide channels whereby means for bending the rod to permit marking guide positions and means for placement of and checking proper axial alignment of guides so placed can be carried out in the channel.

Yet still another example, U.S. Pat. No. 4,315,606 to Seiders teaches a fishing rod eye tying device that includes a base member for receiving a plurality of adjustable rod holding members, a rotatable motor mountable on one end of the base member for rotating a rod held by the rod holding member and a shuttle for guiding the line to be wound on the rod in tying the eye in place, and tension means for maintaining tension on the line.

Still yet another example, U.S. Pat. No. 4,442,981 to Cope teaches a fishing rod wrapping device that includes a fixed frame adapted to support one or more spools of wrapping thread for axial rotation, a friction device resisting rotation of the spool whereby thread may be paid out therefrom under a controlled and adjustable tension, and a support for the fishing rod adapted to support the rod in parallel relation to the spool.

Finally, an example, U.S. Pat. No. 4,691,874 to Inamori et al. teaches an apparatus for winding rods that includes a movable carriage, a plurality of wire winders mounted on the carriage, and a device for moving the carriage to a selected position.

It is apparent that numerous innovations for wrapping devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly it is an object of the present invention to provide a wrapping machine for a fishing rod that avoids the disadvantages of the prior art.

Another object of the present invention is to provide a wrapping machine for a fishing rod that will automatically operate the fishing rod wrapping device needle of my copending application. Still yet another object of the present invention is to provide a wrapping machine for a fishing rod that is computerized and automatically winds multiple portions of the same fishing rod simultaneously.

Yet still another object of the present invention is to provide a wrapping machine for a fishing rod that includes a frame, a table, a winder arrangement, a rod clamp arrangement, a blocker arrangement, a plier arrangement, a cutter arrangement, a needle arrangement, and a micro programmable controller.

Still yet another object of the present invention is to provide a wrapping machine for a fishing rod wherein the frame has a frame top, a frame bottom, and a frame track with a frame track longitudinal axis.

Yet still another object of the present invention is to provide a wrapping machine for a fishing rod wherein the table is movably mounted to the frame track.

Still yet another object of the present invention is to provide a wrapping machine for a fishing rod wherein the winder arrangement is mounted to the table.

Yet still another object of the present invention is to provide a wrapping machine for a fishing rod wherein the rod clamp arrangement is mounted to the table and is disposed behind the winder arrangement.

Still yet another object of the present invention is to provide a wrapping machine for a fishing rod wherein the blocker arrangement is mounted to the table and is disposed behind the winder arrangement.

Yet still another object of the present invention is to provide a wrapping machine for a fishing rod wherein the plier arrangement is mounted to the table and is disposed in front of the winder arrangement.

Still yet another object of the present invention is to provide a wrapping machine for a fishing rod wherein the cutter arrangement is mounted to the table and is disposed in front of the winder arrangement.

Yet still another object of the present invention is to provide a wrapping machine for a fishing rod wherein the needle arrangement is mounted to the winder arrangement and is passable through the winder arrangement.

Still yet another object of the present invention is to provide a wrapping machine for a fishing rod wherein the micro programmable controller is disposed within the frame.

Yet still another object of the present invention is to provide a wrapping machine for a fishing rod wherein the table has a table top plate positioned on the frame top.

Still yet another object of the present invention is to provide a wrapping machine for a fishing rod wherein the table has a table bottom plate positioned on the frame bottom.

Yet still another object of the present invention is to provide a wrapping machine for a fishing rod wherein the table top plate and the table bottom plate are connected to each other by a pair of spaced apart table guides that are positioned within the frame.

Still yet another object of the present invention is to provide a wrapping machine for a fishing rod wherein each of the pair of table guides rotatably contain a rotatable bearing with a bearing female threaded inner race.

Yet still another object of the present invention is to provide a wrapping machine for a fishing rod wherein the frame further has a pair of spaced apart table male threaded rods that are fixedly attached therein.

Still yet another object of the present invention is to provide a wrapping machine for a fishing rod wherein each of the pair of spaced apart table male threaded rods pass through each of the pair of table guides and are threadably received within each of the pair of table guides by the rotatable bearing.

Yet still another object of the present invention is to provide a wrapping machine for a fishing rod wherein each of the pair of male threaded rod mesh with each of the bearing female threaded inner races so that when the pair of rotatable bearings rotate, the pair of guides thread along the pair of table male threaded rods and move the table in the direction of the frame longitudinal axis.

Still yet another object of the present invention is to provide a wrapping machine for a fishing rod wherein the table further has a pair of guide sprocket gears each of which is fixedly attached to each of the rotatable bearings and rotate therewith.

Yet still another object of the present invention is to provide a wrapping machine for a fishing rod wherein the table further has a table motor that is fixedly attached to the table bottom plate and has a table motor sprocket gear attached thereto that turns therewith.

Still yet another object of the present invention is to provide a wrapping machine for a fishing rod wherein the table further has a table chain that connects the table motor sprocket gear to the pair of table rod sprocket gears so that the rotatable bearings rotate when the table motor is activated.

Yet still another object of the present invention is to provide a wrapping machine for a fishing rod wherein the winder arrangement has a torus with a torus front face and a torus back face.

Still yet another object of the present invention is to provide a wrapping machine for a fishing rod wherein the torus is rotatably mounted to the table.

Yet still another object of the present invention is to provide a wrapping machine for a fishing rod wherein the winder arrangement further has a thread spool and a tensioner disposed on the torus front face so that thread emanating from the thread spool passes around the tensioner and is free of slack during the winding operation.

Still yet another object of the present invention is to provide a wrapping machine for a fishing rod wherein the winder arrangement further has a winder pulley that is fixedly attached to the torus back face and coaxial therewith.

Yet still another object of the present invention is to provide a wrapping machine for a fishing rod wherein the winder arrangement further has a winding motor that is fixedly attached to the table and disposed to the side of the torus.

Still yet another object of the present invention is to provide a wrapping machine for a fishing rod wherein the winder arrangement further includes a winder motor pulley that is fixedly attached to the winder motor and turns therewith.

Yet still another object of the present invention is to provide a wrapping machine for a fishing rod wherein the winder further has a winder belt that connects the winder motor pulley to the winder pulley so that the torus rotates when the winder motor is activated.

Still yet another object of the present invention is to provide a wrapping machine for a fishing rod wherein the winder arrangement further has a proximity sensor that is fixedly attached to the table and a torus plate that is fixedly attached to the torus.

Yet still another object of the present invention is to provide a wrapping machine for a fishing rod wherein the proximity sensor in conjunction with the torus plate function to count the number of revolutions of the torus.

Still yet another object of the present invention is to provide a wrapping machine for a fishing rod wherein the winder arrangement further has a guide needle with a guide needle eye so that the thread passes through the guide needle eye.

Yet still another object of the present invention is to provide a wrapping machine for a fishing rod wherein the guide needle is fixedly attached to and extends inwardly from the torus.

Still yet another object of the present invention is to provide a wrapping machine for a fishing rod wherein the rod clamp arrangement has a lower chuck which is fixedly attached to the table.

Yet still another object of the present invention is to provide a wrapping machine for a fishing rod wherein the lower chuck has a lower chuck upper surface that contains a substantially "V"-shaped recess so that a fishing rod can be cradle therein.

Still yet another object of the present invention is to provide a wrapping machine for a fishing rod wherein the rod clamp arrangement further has a clamp solenoid that is disposed above the lower chuck and is fixedly attached to the table so that the fishing rod can be secured within the recess.

Yet still another object of the present invention is to provide a wrapping machine for a fishing rod wherein the blocker arrangement has a lower blocker which is movably mounted to the table.

Still yet another object of the present invention is to provide a wrapping machine for a fishing rod wherein the blocker arrangement further has an upper blocker which is movably mounted to the table.

Yet still another object of the present invention is to provide a wrapping machine for a fishing rod wherein the blocker arrangement further has a lower blocker solenoid that is fixedly attached to the table and communicates with the lower blocker.

Still yet another object of the present invention is to provide a wrapping machine for a fishing rod wherein the blocker arrangement further has an upper blocker solenoid that is fixedly attached to the table and communicates with the upper blocker.

Yet still another object of the present invention is to provide a wrapping machine for a fishing rod wherein the plier arrangement has a plier with a plier first leg that is fixedly attached to the table, a plier second leg that is movable relative to the plier first leg, and a plier jaw that extends substantially perpendicular to the plier first leg and the plier second leg towards the winder arrangement.

Still yet another object of the present invention is to provide a wrapping machine for a fishing rod wherein the plier arrangement further has a plier solenoid that is fixedly attached to the table and pivotally communicates with the plier second leg.

Yet still another object of the present invention is to provide a wrapping machine for a fishing rod wherein the cutter arrangement has a stationary portion that is fixedly attached to the table and a blade portion that is movably mounted to the stationary portion.

Still yet another object of the present invention is to provide a wrapping machine for a fishing rod wherein the cutter arrangement further has a plurality of adjusting screws so that the cutter arrangement can be precisely positioned for accurate cutting of the wrapping thread.

Yet still another object of the present invention is to provide a wrapping machine for a fishing rod wherein the cutter arrangement further has a cutter solenoid that is fixedly attached to the table to a side of and in alignment with the blade portion.

Still yet another object of the present invention is to provide a wrapping machine for a fishing rod wherein the needle arrangement has a needle solenoid that is fixedly attached to the table, the fishing rod wrapping device needle that is movably mounted to the needle solenoid and that has a needle fixed end, and a needle stop that is disposed on the needle fixed end and releasably engageable with the blocker arrangement.

Yet still another object of the present invention is to provide a wrapping machine for a fishing rod wherein the micro programmable controller is attached to the frame by a fastener selected from a group consisting of snaps and screws.

Still yet another object of the present invention is to provide a wrapping machine for a fishing rod wherein the micro programmable controller utilizes a single cable for at least 6 inputs and a key matrix function for at least 14 outputs.

Yet still another object of the present invention is to provide a wrapping machine for a fishing rod wherein the at least 6 inputs include a needle override to override the needle arrangement, a plier override to override the plier arrangement, a table proximity switch, a counter proximity switch, a stop, and a start.

Still yet another object of the present invention is to provide a wrapping machine for a fishing rod wherein the at least 14 outputs include a "WINDER MOTOR 200 RPM FAST SPEED" and a "WINDER MOTOR 10 RPM SLOW SPEED" which operate wind motor relays and ultimately the winder arrangement, a "TABLE MOTOR 10 RPM FORWARD SPEED" and a "TABLE MOTOR 37 RPM REVERSE SPEED" which operate table motor relays and ultimately the table, a "PLIERS ON POSITION" and a "PLIERS OFF POSITION" which operate the plier arrangement, a "NEEDLE ON POSITION" and a "NEEDLE OFF POSITION" which operate the needle arrangement, a "BLOCKING ON POSITION" and a "BLOCKING OFF POSITION" which operate the blocking arrangement, a "CUTTER ON POSITION" and a "CUTTER OFF POSITION" which operate the cutter arrangement, a "POLE CLAMP ON POSITION" and a "POLE CLAMP OFF POSITION" which operate the clamp arrangement.

Yet still another object of the present invention is to provide a wrapping machine for a fishing rod wherein the micro programmable controller further has a built-in EEPROM memory for storing programs.

Still yet another object of the present invention is to provide a wrapping machine for a fishing rod wherein the micro programmable controller further has a small hand held program loader key board that uses conventional relay symbol format so that adjustment of the parameters for different fishing rods is facilitated.

Yet still another object of the present invention is to provide a wrapping machine for a fishing rod wherein the micro programmable controller is operated by a 24 V DC built in power supply so that the need for an external power supply is eliminated while reducing the amount of wire necessary and the problems related therewith.

Still yet another object of the present invention is to provide a wrapping machine for a fishing rod wherein the micro programmable controller accepts the at least 6 inputs regardless of scan time.

Yet still another object of the present invention is to provide a wrapping machine for a fishing rod wherein the micro programmable controller is two programmable logic controllers. Typically such controllers are manufactured by Square D Company located in Palatine, Ill. 60067, sold under the trademark MICRO-1 (R).

Still yet another object of the present invention is to provide a wrapping machine for a fishing rod wherein the winder arrangement has a torus with a torus front face, a torus back face, a torus outer perimeter, and a torus slot that passes completely through the torus and extends from the torus outer perimeter to the torus central opening so that a fishing rod can be loaded into the winder arrangement from overhead.

Yet still another object of the present invention is to provide a wrapping machine for a fishing rod wherein the winder arrangement further has a winder sprocket gear that is fixedly attached to the torus back face and coaxial therewith.

Still yet another object of the present invention is to provide a wrapping machine for a fishing rod wherein the winder arrangement further includes a motor sprocket gear that is fixedly attached to the winder motor and turns therewith and a winder idler sprocket gear that is rotatably attached to the table and positioned a distance to the side of the motor sprocket gear.

Yet still another object of the present invention is to provide a wrapping machine for a fishing rod wherein the winder arrangement further has a winder chain that connects the winder motor sprocket gear to the winder idler sprocket gear to the winder sprocket gear so that the torus rotates when the winder motor is activated.

Finally, an object of the present invention is to provide a method for using the fishing rod wrapping device that comprises the steps of assuring that the fishing rod wrapping device is in the initial position, threading manually the loose end of the initial portion of the wrapping thread through the guide needle eye, positioning manually the loose end of the initial portion of the wrapping thread intermediate the plier jaws, activating the plier solenoid so that the plier arrangement automatically assumes the closed position and the plier jaws grasp the loose end of the initial portion of the wrapping thread, positioning manually a fishing rod in the clamp arrangement, activating the clamp solenoid so that the clamp arrangement automatically assumes the closed position and the fishing rod is automatically retained in the clamp arrangement, setting the winder motor to high speed, setting the table motor to forward slow speed, depressing manually a start button so that the winder motor, the table motor, and the proximity sensor are automatically activated and a wind count begins, wrapping automatically the initial portion of the wrapping thread around the fishing rod at a position adjacent to where the eyelet has been adhered, ceasing automatically rotation of the table motor when the wind count is 3, resuming automatically rotation of the table motor when the wind count is 5, activating automatically the plier solenoid when the wind count is 11 so that the plier arrangement assumes the open position, trapping automatically the loose end of the initial portion of the wrapping thread under subsequent wraps so that the initial portion of the wrapping thread is tied in the initial knot, moving automatically the winder thread guide 90 degrees passed the winder home position when 0.1 second has elapsed after the wind count has reached 15 so that the needle guide becomes free of the needle arrangement, activating automatically the blocking upper solenoid and the blocking lower solenoid so that the blocking arrangement assumes the blocking position, activating automatically the needle solenoid so that the needle arrangement assumes the partially extended position wherein the needle is automatically positioned adjacent to the fishing rod with the needle jaw blade assembly positioned in the area of the base of the adhered eyelet and the torus continues to rotate automatically pressing the needle tightly against the fishing rod while remaining wraps automatically overlap the needle, resuming automatically the winder motor to a low speed when the wind count equals the total number of wraps minus 2, ceasing automatically rotation of the winder motor at the winder home position when the wind count equals the total number of wraps, the table motor continues to rotate so that the wrapping thread is automatically pulled into position for the needle, activating automatically the upper blocking solenoid and the lower blocking solenoid two seconds after the table motor stops so that the blocking arrangement assumes the open position, activating automatically the needle solenoid so that the needle arrangement assumes the fully extended position, wrapping the remaining portion of the wrapping thread around both the eyelet and the needle jaw blade assembly, sliding the end of the remaining portion of the wrapping thread inward along the needle slot to the junction of the needle jaw blade assembly major projection inner surface paw and the needle jaw blade assembly minor projection inner surface paw, urging the remaining portion of the wrapping thread towards the needle eye forcing the needle jaw blade assembly major projection inner surface paw and the needle jaw blade assembly minor projection inner surface paw to separate from each other so that the end of the remaining portion is positioned within the needle eye, activating automatically the plier solenoid after a 0.8 second delay so that the plier arrangement assumes the grip position and the plier jaws grasp the wrapping thread, activating automatically the needle solenoid after another 0.4 second delay so that the needle arrangement assumes the fully retracted position, the cutter solenoid is automatically activated so that the cutter arrangement assumes the cutting position, the blade portion cuts the wrapping thread, the needle escapes from the remaining portion of the wrapping thread, and the needle pulls the end of the remaining portion between the wraps and the fishing rod, tying automatically the remaining portion in a final knot so that the eyelet is securely fastened to the fishing rod, removing automatically the end of the remaining portion from the needle eye, the plier jaws grasp the end of the wrapping thread that is remaining on the thread spool, activating automatically the cutter solenoid when another 0.4 seconds has elapsed so that the cutter arrangement assumes the retracted position, switching automatically the table motor to high speed and reverse, turning on automatically the table motor so that the table returns back to the table home position, activating automatically the clamp solenoid so that the clamp arrangement assumes the open position, and removing manually the fishing rod from the clamp arrangement.

The novel features which are considered characteristic of the present invention are set forth in the appended claims. The invention itself, however, both as to its construction and its method of operation, together with additional and advantages thereof, will be best understood from the following description of the preferred embodiment when read and understood in conjunction with the accompanying drawing.

LIST OF REFERENCE NUMERALS UTILIZED
IN THE DRAWING 1-fishing rod wrapping needle
2-body portion
3-jaw blade major projection
3A-jaw blade major projection inner surface
3AA-jaw blade major projection inner surface intermediate position
4-jaw blade major projection paw
5-jaw blade minor projection
5A-jaw blade minor projection inner surface
5AA-jaw blade minor projection inner surface intermediate position
6-jaw blade minor projection paw
7-jaw blade slot 8-needle eye
10-wrapping device for a fishing rod of the present invention
10A-plurality of work stations
12A-frame fishing rod stop
13-fishing rod
14-frame
14A-frame track
15-eyelet
16-table
16A-table top plate
16B-table bottom plate
16C-pair of spaced apart table guides
16D-pair of spaced apart table male threaded rods
16E-pair of guide sprocket gears
16F-table motor
16FA-table motor sprocket gear
16G-table chain
18-winder arrangement
20-rod clamp arrangement
22-blocker arrangement
23-torus
23A-torus front face
23B-torus back face
23C-torus plate
24-plier arrangement
25-wrapping thread
26-cutter arrangement
26A-stationary portion
26B-blade portion
28-tensioner
29-micro programmable controller
29A-needle override
29B-plier override
29C-table proximity switch
29D-counter proximity switch
29E-stop
29F-start
29G-"WINDER MOTOR 200 RPM FAST SPEED"
29H-"WINDER MOTOR 10 RPM SLOW SPEED"
29I-"TABLE MOTOR 10 RPM FORWARD SPEED"
29J-"TABLE MOTOR 37 RPM REVERSE SPEED"
29K-"PLIERS ON POSITION"
29L-"PLIER$ OFF POSITION"
29M-"NEEDLE ON POSITION"
29N-"NEEDLE OFF POSITION"
29U-"BLOCKING ON POSITION"
29P-"BLOCKING OFF POSITION"
29Q-"CUTTER ON POSITION"
29R-"CUTTER OFF POSITION"
29S-"POLE CLAMP ON POSITION"
29T-"POLE CLAMP OFF POSITION"
29U-"BLOCKING ON POSITION"
30-winder pulley
31-needle arrangement
31A-needle solenoid
31B-needle stop
32-winder motor
32A-winder motor pulley
33-thread spool
34-winder belt
36-proximity sensor
38-lower chuck
38A-"V"-shaped recess
39-hand held program loader key pad
40-clamp solenoid
42-lower blocker
42A-lower blocker solenoid
44-upper blocker
44A-upper blocker solenoid
46-plier
46A-plier first leg
46B-plier second leg
48-plier jaws
49-plier solenoid
49A-plunger ram
50-plurality of adjusting screws
52-cutter solenoid
54-guide needle
54A-guide needle eye
118-winder arrangement
123-torus
123A-torus front face
123B-torus back face
123C-torus perimeter
123D-torus center opening
125-thread
128-tensioner
130-winder sprocket gear
131-slot
132-winding motor
132A-winder motor sprocket gear
133-thread spool
134-winder sprocket chain
135-plurality of bearings
137-pair of winder idler sprocket gears
154-guide needle
154A-guide needle eye

DETAILED DESCRIPTION OF THE PREFERRED EMBODIMENT

Figures 1, 1A, 2, 3, 4, 5, 6, 7:
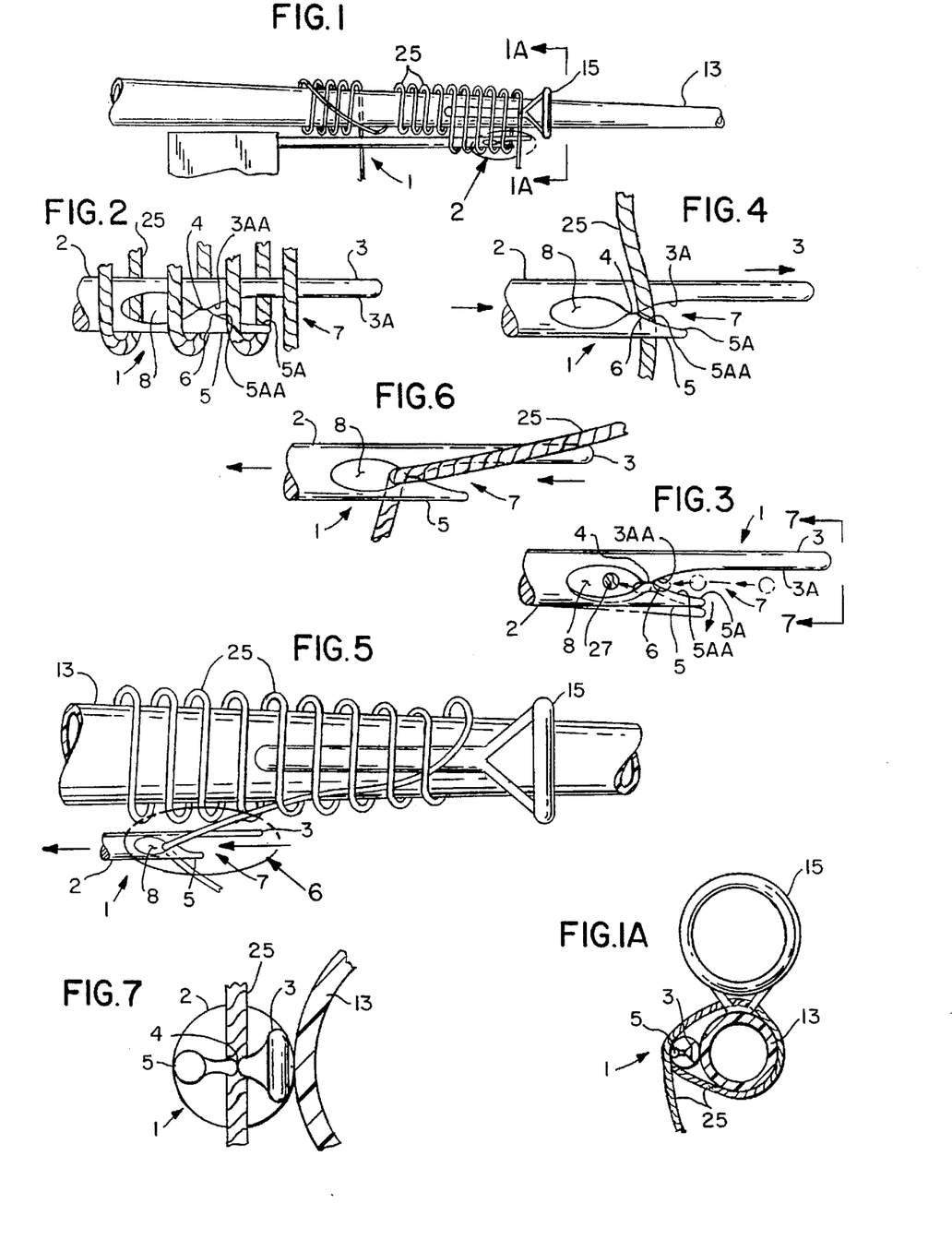
FIG. 1 is a diagrammatic plan view showing how the needle device of the instant invention cooperates with a fishing pole blank to secure the wrapping thread, that has been applied thereto.
FIG. 1A is a diagrammatic cross sectional view taken on line 1A of FIG. 1.
FIG. 2 is an enlarged view of the area in the dotted curve indicated by arrow 2 in FIG. 1 showing the needle device in greater detail.
FIG. 3 is an enlarged view of the needle device diagrammatically illustrating the thread being drawn through the jaws into the eye.
FIG. 4 is an enlarged diagrammatic partial side view of the needle illustrating the wrapping thread about to be drawn through the jaws into the needle eye.
FIG. 5 is an enlarged diagrammatic plan view showing the fishing pole blank after the needle device has secured the wrapping thread thereto.
FIG. 6 is an enlarged view of the area in the dotted curve indicated by arrow 6 in FIG. 5 showing the needle device in greater detail.
FIG. 7 is an enlarged diagrammatic view taken on line 7—7 of FIG. 3 with a piece of the cooperating fishing pole blank shown in cross section.
Figures 8, 9, 10, 11:
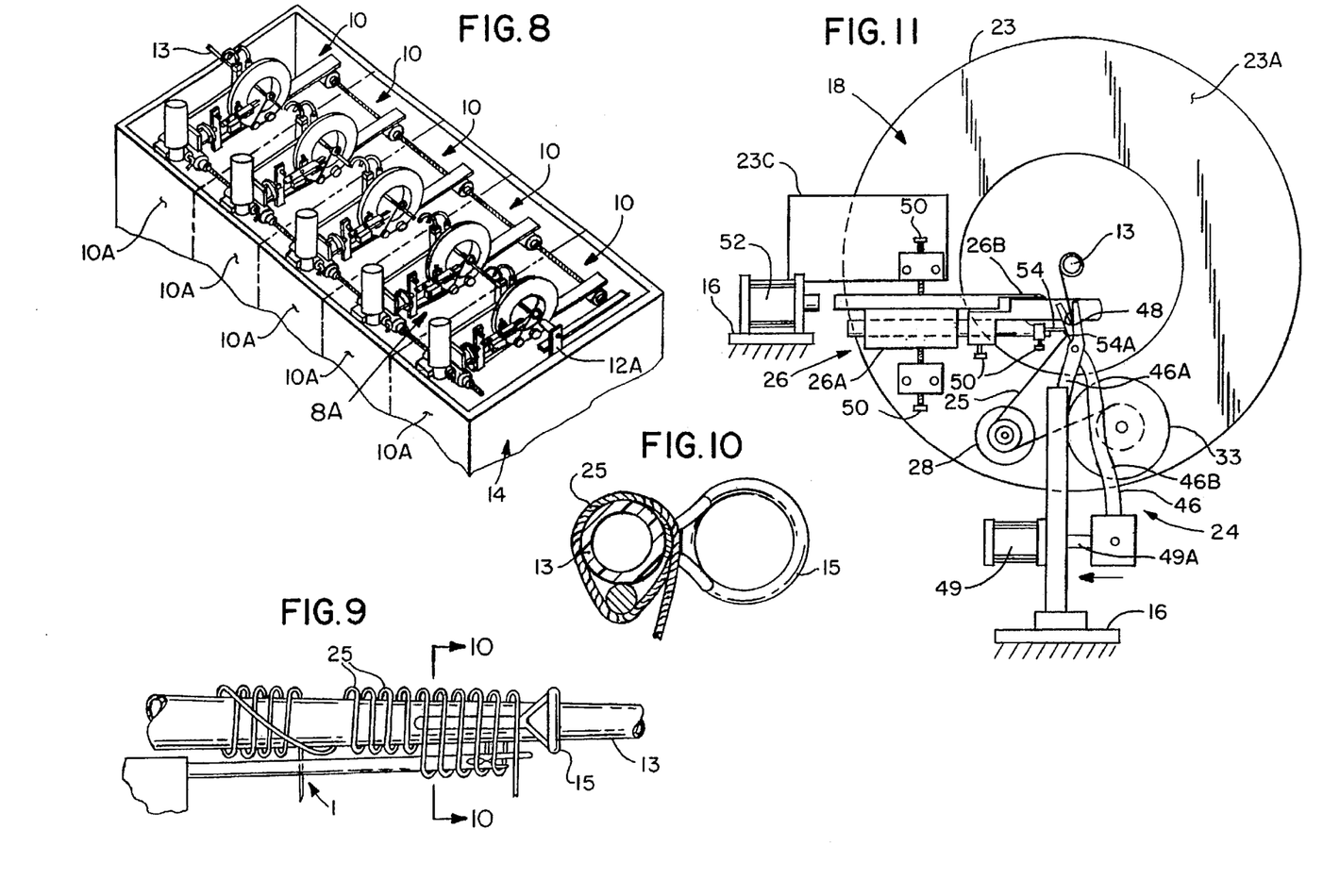
FIG. 8 is a diagrammatic perspective view of the instant invention with parts broken away.
FIG. 9 is a diagrammatic plan view showing how the needle device of the instant invention cooperates with a fishing pole blank to secure the wrapping thread, that has been applied thereto.
FIG. 10 is a cross sectional view taken on line 10—10 of FIG. 9.
FIG. 11 is a side elevational view taken in the direction of arrow 11 in FIG. 8A with parts broken away of a rotational torus and some of its cooperating components of a typical winding station.

Referring now to the figures, and particularly to FIG. 8, the wrapping machine for a fishing rod is shown generally at 10, set up in a plurality of individual work stations 10A. The plurality of work stations 10A are removably mounted to a frame 14 that has a frame fishing rod stop 12A and that apply wrapping thread to a plurality of positions of the same fishing rod 13, simultaneously. The fishing rod stop 12A prevents longitudinal movement of the fishing rod 13 within the frame 12.

Figures 8A, 8B:
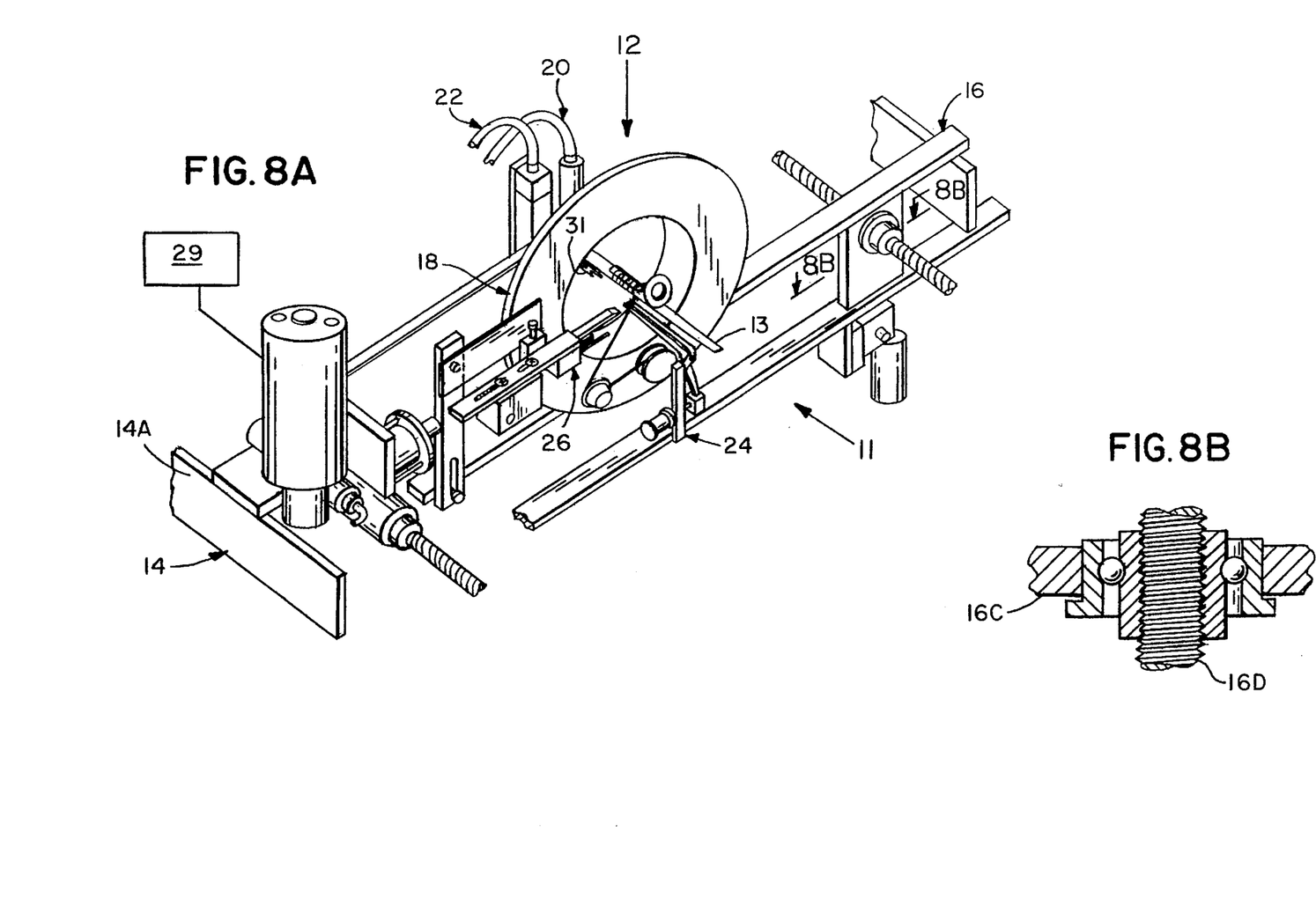
FIG. 8A is an enlarged diagrammatic perspective view of typically one work station indicated by arrow 8A in FIG. 8.
FIG. 8B is an enlarged cross sectional view taken on line 8B—8B of FIG. 8A illustrating a typical table guide rotatably containing a bearing.

The general configuration of the wrapping machine for a fishing rod 10 can best be seen in FIG. 8A, and as such, will be discussed with reference thereto.

The wrapping machine for a fishing rod 10 includes the frame 14 with a frame track 14A, a table 16 located within the frame 14 and movable on the frame track 14A along the longitudinal direction of the frame track 14A, a winder arrangement 18 rotatably mounted to the table 16, a rod clamp arrangement 20 fixedly attached to the table 16 behind the winder arrangement 18 for securing the fishing rod 13 thereto, a blocker arrangement 22 fixedly attached to the table 16, a plier arrangement 24 fixedly attached to the table 16 in front of the winder arrangement 18, a cutter arrangement 26 fixedly attached to the table 16 in front of the winder arrangement 18, a needle arrangement 31 positioned through the winder arrangement 18, and a micro programmable controller 29 disposed within the frame 14.

Figures 12, 13, 13A, 14:
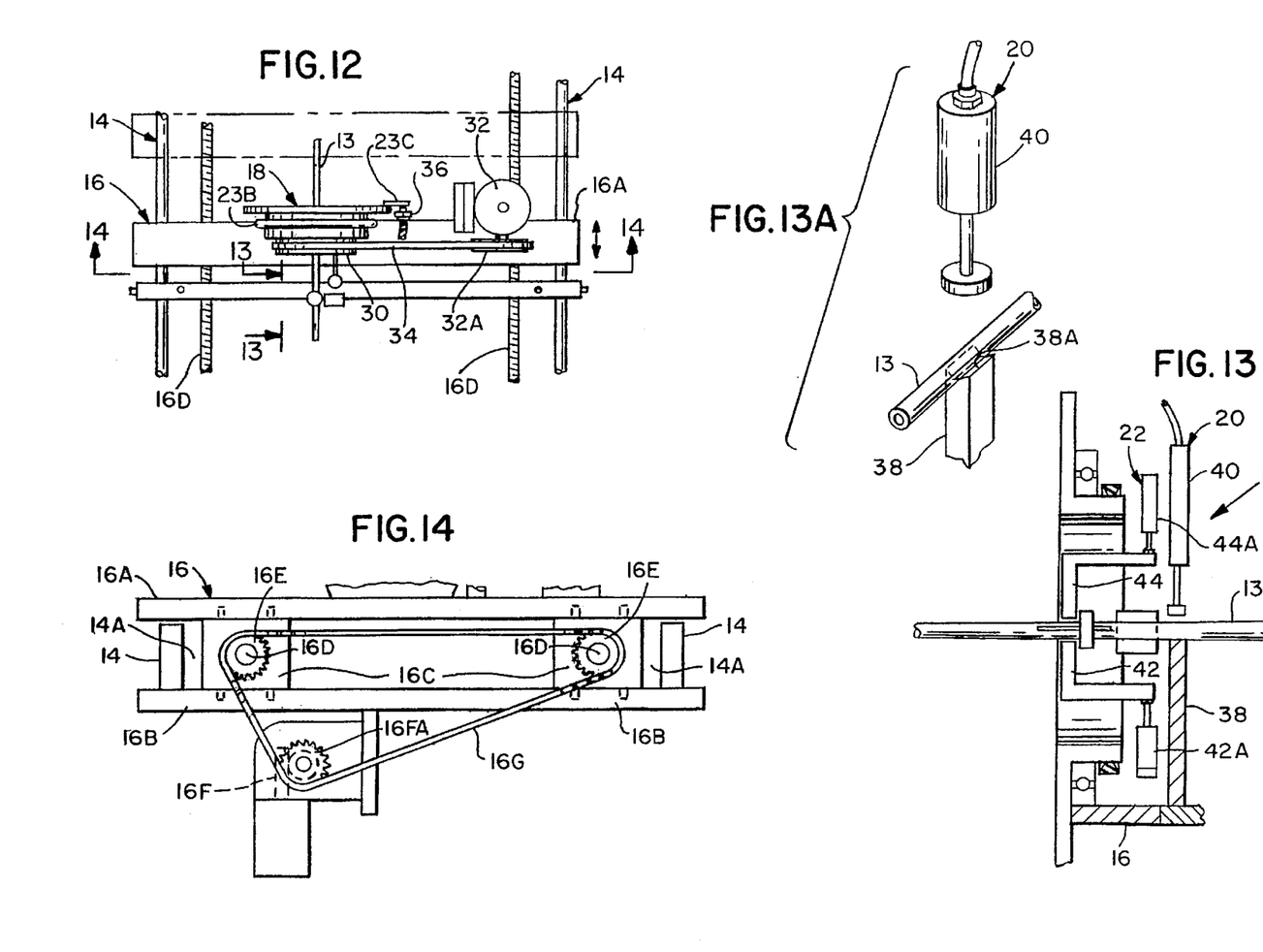
FIG. 12 is a top elevational view taken in the direction of arrow 12 in FIG. 8A with parts broken away.
FIG. 13 is an enlarged diagrammatic view illustrating the needle moving mechanism.
FIG. 13A is a diagrammatic perspective view taken generally in the area of arrow 13A of FIG. 13 of the fishing rod clamping mechanism.
FIG. 14 is a cross sectional view taken on line 14—14 of FIG. 12.

The configuration of the table 16 can best be seen in FIGS. 12 and 14, and as such will be discussed with reference thereto.

The table 16 includes a table top plate 16A and a table bottom plate 16B that are connected to each other by a pair of spaced apart table guides 16C. Each of a pair of spaced apart table male threaded rods 16D are fixedly attached to the frame 14 and do not rotate. Each of the pair of spaced apart table male threaded rods 16D pass through each of the pair of table guides 16C and are received within each of the pair of guides 16C by the inner race of a female threading of a bearing, as shown in FIG. 8B. Each of a pair of guide rod sprocket gears 16E is fixedly attached to each of the bearings and rotate therewith about each of the pair of table male threaded rods 16D.

A table motor 16F is fixedly attached to the lower surface of the table 16 and has a table motor sprocket gear 16FA attached to a shaft extending therefrom. A table chain 16G connects the table motor sprocket gear 16FA to the pair of table rod sprocket gears 16D allowing the bearings to rotate when the table motor 16F is activated.

Since each of the bearings are rotatably mounted within each of the pair of guides 16C and the pair of table male threaded rods 16D are fixedly attached to the frame 14, when the pair of bearings rotate they thread along the pair of table male threaded rods 16C and move the table 16.

The configuration of the winder arrangement 18 can best be seen in FIGS. 8A, 11 and 12, and as such will be discussed with reference thereto.

The winder arrangement 18 includes a torus 23 that is rotatably mounted to the table 16 and has a torus front face 23A and a torus back face 23B. Disposed on the torus front face 23A is a thread spool 33 and a tensioner 28. The wrapping thread 25 emanates from the thread spool 33 and passes around the tensioner 28. The tensioner 28 eliminates slack in the thread 25 during the winding operation. Fixedly attached on the torus back face 23B and coaxial therewith is a winder pulley 30.

A winding motor 32 which has a "LOW SPEED" of 10 rpm and a "HIGH SPEED" of 200 rpm is fixedly attached to the table 16 and disposed to the side of the torus 23. A winder motor pulley 32A is attached to a shaft extending from the winder motor 32. A winder belt 34 connects the winder motor pulley 32A to the winder pulley 30 allowing the torus 23 to rotate when the winder motor 32 is activated.

A proximity sensor 36 is fixedly attached to the table 16 and in conjunction with a torus plate 23C, that is fixedly attached to the torus 23, functions to count the number of revolutions of the torus 23 and to designate the "WINDER HOME POSITION".

A guide needle 54 having a guide needle eye 54A is fixedly attached to and extends inwardly from the torus 23. The thread 25 passes through the guide needle eye 54A.

The configuration of the rod clamp arrangement 20 can best be seen in FIGS. 8A, 13 and 13A, and as such will be discussed with reference thereto.

The rod clamp arrangement 20 has a "CLAMPED POSITION" and an "OFF POSITION" and includes a lower chuck 38 which is fixedly attached to the table 16 and has a substantially "V"-shaped recess 38A in the upper surface. The "V"-shaped recess 38A cradles the fishing rod 13. Disposed above the lower chuck 38 and also fixedly attached to the table 16 is a clamp solenoid 40 whose plunger functions to secure the fishing rod 13 to the lower chuck 38.

The configuration of the blocker arrangement 22 can best be seen in FIGS. 8A and 13, and as such will be discussed with reference thereto.

The blocker arrangement 22 has a "BLOCKING POSITION" and an "OPEN POSITION" and includes a lower blocker 42 movably mounted to the table 16, and an upper blocker 44 also movably mounted to the table 16. Attached to the lower blocker 42 and also fixedly attached to the table 16 is a lower blocker solenoid 42A. Attached to the upper blocker 44 and also fixedly attached to the table 16 is an upper blocker solenoid 44A. The lower blocker solenoid 42A and the upper blocker solenoid 44A function to move the lower blocker 42 and the upper blocker 44 through the "BLOCKING POSITION" and the "OPEN POSITION".

The configuration of the plier arrangement 24 can best be seen in FIGS. 8A and 11, and as such will be discussed with reference thereto.

The plier arrangement 24 has a "GRIP POSITION" and an "OPEN POSITION" and includes a plier 46 with a plier first leg 46A fixedly attached to the table 16 and a plier second leg 46B movable relative to the plier first leg 46A. Plier jaws 48 extend inwardly towards the torus 23 and are substantially perpendicular to the plier first leg 46A and the plier second leg 46B.

A plier solenoid 49 is fixedly attached to the table 16, via the plier first leg 46A. A plunger ram 49A is pivotally connected to the plier second leg 46B and functions to move the plier second leg 46B through the "GRIP POSITION" and the "OPEN POSITION".

The configuration of the cutter arrangement 26 can best be seen in FIGS. 8A and 11, and as such will be discussed with reference thereto.

The cutter arrangement 26 has a "CUTTING POSITION" and a "RETRACTED POSITION" and includes a stationary portion 26A fixedly attached to the table 16 and a blade portion 26B movably mounted within the stationary portion 26A. A plurality of adjusting screws 50 are present to precisely position the cutter arrangement 26 for accurate cutting of the thread 25.

A cutter solenoid 52 is fixedly attached to the table 16, to the side of and in alignment with the blade portion 26B. The cutter solenoid 52 functions to move the blade portion 26B through the "CUTTING POSITION" and the "RETRACTED POSITION".

The configuration of the needle arrangement 31 can best be seen in FIGS. 1–7, 9, 10, and 15, and as such will be discussed with reference thereto.

The needle arrangement 31 has a "NEEDLE FULLY RETRACTED POSITION", a "NEEDLE PARTIALLY EXTENDED POSITION", and a "NEEDLE FULLY EXTENDED POSITION" and includes a needle solenoid 31A fixedly attached to the table 16, the fishing rod wrapping device needle 1 which is movably mounted to the needle solenoid 31A, and a needle stop 31B disposed on the fixed end of the fishing rod wrapping device needle 1 that is engageable with the upper blocker 44 and the lower blocker 42.

Figure 19:
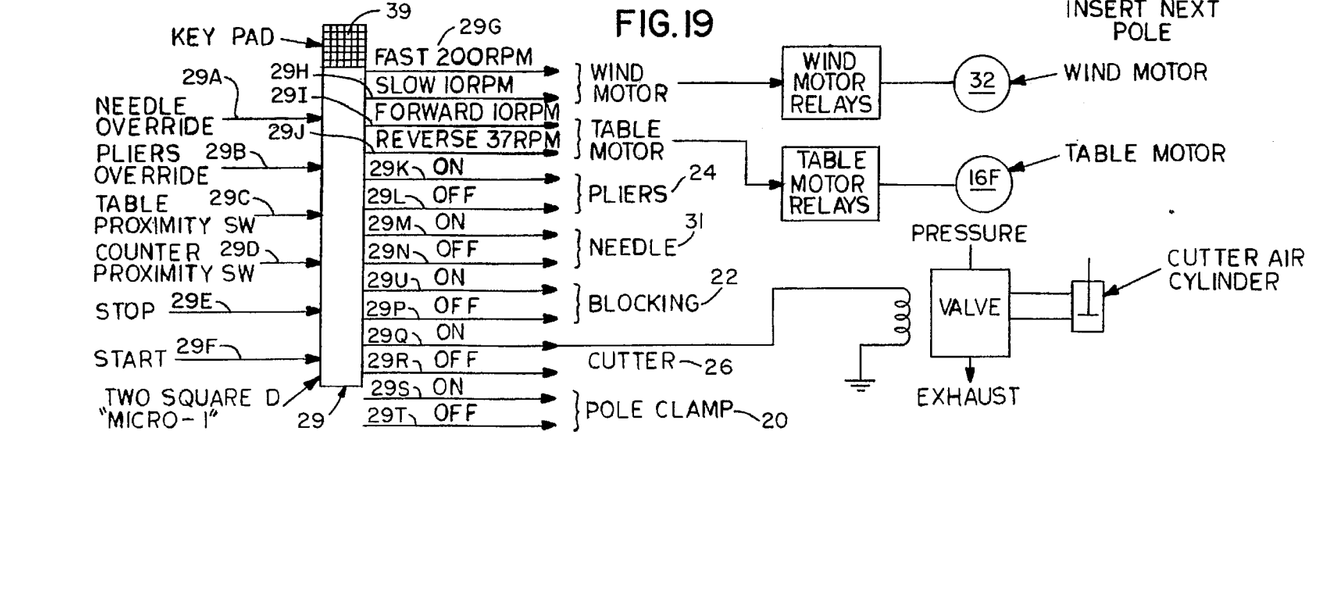
FIG. 19 is a diagrammatic block diagram showing the motors and valves of a typical winding station.

The configuration of the micro programmable controller 29 can best be seen in FIG. 19, and as such, will be discussed with reference thereto.

The micro programmable controller 29 controls the operation of the various elements of the wrapping machine for a fishing rod 10 and can be snap mounted or screwed to the frame 12. The micro programmable controller 29 consists of two programmable logic controllers utilizing a single cable for the 6 inputs and a key matrix function for the 14 outputs.

The 6 inputs include a needle override 29A, a plier override 29B, a table proximity switch 29C, a counter proximity switch 29D, a stop 29E, and a start 29F.

The 14 outputs include a "WINDER MOTOR 200 RPM FAST SPEED" 29G and a "WINDER MOTOR 10 RPM SLOW SPEED" 29H which operate the wind motor relays and ultimately the wind motor 32, a "TABLE MOTOR 10

RPM FORWARD SPEED" 29I and a "TABLE MOTOR 37 RPM REVERSE SPEED" 29J which operate the table motor relays and ultimately the table motor 16F, a "PLIERS ON POSITION" 29K and a "PLIERS OFF POSITION" 29L which operate the plier arrangement 24, a "NEEDLE ON POSITION" 29M and a "NEEDLE OFF POSITION" 29N which operate the needle arrangement 31, a "BLOCKING ON POSITION" 29U and a "BLOCKING OFF POSITION" 29P which operate the blocking arrangement 22, a "CUTTER ON POSITION" 29Q and a "CUTTER OFF POSITION" 29R which operate the cutter arrangement 26, a "POLE CLAMP ON POSITION" 29S and a "POLE CLAMP OFF POSITION" 29T which operate the clamp arrangement 20.

Programs are stored in a built-in EEPROM memory without the need for a backup power supply. The micro programmable controller 29 is programmed by use of a small hand held program loader key pad 39 using the conventional relay symbol format which makes it simple to adjust the parameters for different fishing rods 13. The micro programmable controller 29 is operated by a 24 V DC built in power supply which eliminates the need for an external power supply while reducing the amount of wire necessary and the problems related therewith. The micro programmable controller 29 accepts a 0.1 msec pulse input signal allowing the 6 inputs to be accepted regardless of the scan time.

The operation of the winding device for a fishing rod 10 can best be seen in FIGS. 1–7, 9, 10, 15 and 18, and as such, will be discussed with reference thereto.

Figure 18:
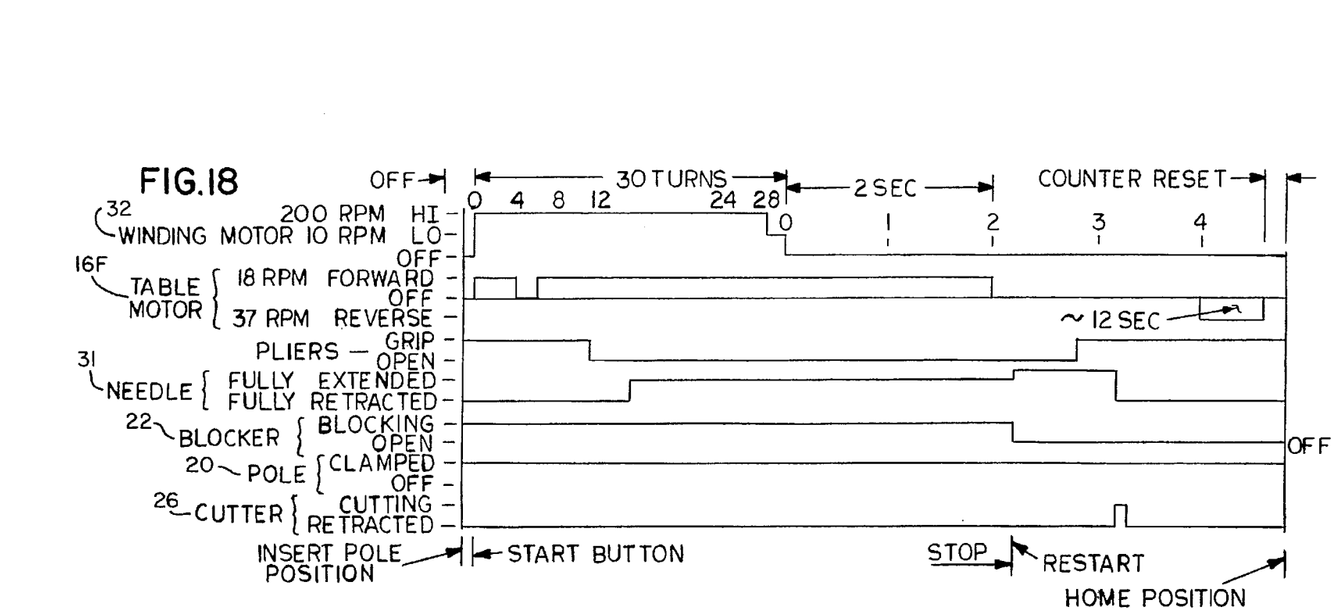
FIG. 18 is a timing diagram illustrating the sequence of events and signals required to operate a typical winding station in order that a typical eyelet be secured to fishing rod by wrapping.

Initially, the elements of the wrapping device for a fishing rod 10 are in the following positions. The needle arrangement 31 is in the "NEEDLE FULLY RETRACTED POSITION", the blocking arrangement 22 is in the "BLOCKING POSITION", the table 16 is in the "TABLE HOME POSITION", the winder arrangement 18 is in the "WINDER HOME POSITION", the plier arrangement 24 is in the "PLIER OPEN POSITION", and the clamp arrangement 20 is in the "CLAMP OFF POSITION".

If the needle arrangement 31 is not in the "NEEDLE FULLY RETRACTED POSITION", then the needle solenoid 31A is activated and the needle automatically assumes the "NEEDLE RETRACTED POSITION".

If the blocking arrangement 22 is not in the "BLOCKING POSITION", then the upper blocking solenoid 44A and the lower blocking solenoid 42A are activated and the blocking arrangement 22 automatically assumes the "BLOCKING POSITION".

If the table 16 is not in the "TABLE HOME POSITION", then the table motor 16F is activated and the table 16 automatically assumes the TABLE HONE POSITION;

If the winder arrangement 18 is not in the "WINDER HOME POSITION", then the winder motor 32 is activated and the winding arrangement 18 automatically assumes the "WINDER HOME POSITION".

If the plier arrangement 24 is not in the "PLIER OPEN POSITION", then the plier solenoid 49 is activated and the plier arrangement 24 automatically assumes the "PLIER OPEN POSITION".

If the clamp arrangement 20 is not in the "CLAMP OFF POSITION", then the clamp solenoid 40 is activated and the clamp arrangement 20 automatically assumes the "CLAMP OFF POSITION".

Subsequent to the initialization, the loose end of the initial portion of the wrapping thread 25 is manually threaded through the guide needle eye 54A.

Subsequently, the loose end of the initial portion of the wrapping thread 25 is manually positioned intermediate the open plier jaws 48.

Subsequently, the plier solenoid 48 is activated.

Simultaneously, the plier arrangement 24 automatically assumes the "GRIP POSITION".

Simultaneously, the plier jaws 48 grasp the loose end of the initial portion of the wrapping thread 25.

Subsequently, the fishing rod 13 is manually positioned in the clamp arrangement 20.

Subsequently, the clamp solenoid 40 is activated.

Simultaneously, the clamp arrangement 20 automatically assumes the "CLAMPED POSITION".

Simultaneously, the fishing rod 13 is automatically retained in the clamp arrangement 20.

Subsequently, the winder motor 32 is set for "HIGH SPEED".

Subsequently, the table motor 16F is set for "FORWARD SLOW SPEED".

Subsequently, the start button is depressed.

Simultaneously, the winder motor 32 is automatically activated.

Simultaneously, the table motor 16F is automatically activated.

Simultaneously, the proximity sensor 36 is automatically activated.

Simultaneously, the wind count begins.

Subsequently, the initial portion of the wrapping thread 25 is wrapped around the fishing rod 13 at the position adjacent to where the eyelet has been adhered.

Subsequently, when the wind count is 3, the table motor 16F automatically ceases to rotate.

Subsequently, when the wind count is 5, the table motor 16F automatically resumes rotation.

Subsequently, when the wind count is 11, the plier solenoid 49 is automatically activated.

Simultaneously, the plier arrangement 24 assumes the "OPEN POSITION".

Subsequently, the loose end of the initial portion of the wrapping thread 25 becomes trapped under subsequent wraps.

Simultaneously, the initial portion of the wrapping thread 25 is tied in the initial knot.

Subsequently, when 0.1 second has elapsed after the wind count has reached 15, the guide needle 54 automatically moves 90 degrees passed the "WINDER HOME POSITION".

Simultaneously, the guide needle 54 becomes free of the needle arrangement 31.

Subsequently, the blocking upper solenoid 44A and the blocking lower solenoid 42A are automatically activated.

Simultaneously, the blocking arrangement 22 assumes the "BLOCKING POSITION".

Subsequently, the needle solenoid 31A is automatically activated.

Simultaneously, the needle arrangement 31 assumes the NEEDLE PARTIALLY EXTENDED POSITION, due to the blocking arrangement 22 assuming the "BLOCKING POSITION", the needle can not assume the NEEDLE FULLY EXTENDED POSITION.

Simultaneously, the needle 1 is automatically positioned adjacent to the fishing rod 13 with the needle jaw blade assembly 3.5 positioned in the area of the base of the adhered eyelet 15.

Simultaneously, the torus 23 continues to rotate.

Simultaneously, the needle 1 is automatically pressed tight against the fishing rod 13.

Simultaneously, the remaining wraps automatically overlap the needle 1.

Subsequently, when the wind count equals the total number of wraps minus 2, the winding motor 32 automatically assumes the "LOW SPEED".

Subsequently, when the wind count equals the total number wraps, the wind motor 32 is automatically ceases rotation at the "WINDER HOME POSITION".

Simultaneously, the table motor 16F continues to rotate.

Simultaneously, the wrapping thread 25 is automatically pulled into position for the needle 1.

Subsequently, two seconds after the table motor 16F stops, the upper blocking solenoid 44A and the lower blocking solenoid 42A are automatically activated.

Simultaneously, the blocking arrangement 22 assumes the "OPEN POSITION".

Subsequently, the needle solenoid 31A is automatically activated.

Simultaneously, the needle arrangement 31 assumes the FULLY EXTENDED POSITION.

Subsequently, the remaining portion of the wrapping thread 25 is wrapped around both the positioned eyelet 15 and the needle jaw blade 3.5.

Subsequently, the end of the remaining portion of the wrapping thread 25 is slid inward along the needle slot 7 to the junction of the needle jaw blade assembly major projection inner surface paw 4 and the needle jaw blade assembly minor projection inner surface paw 6 which is facilitated by the presence of the smooth sides and the concave surface of the needle slot 7.

Subsequently, the end of the remaining portion of the wrapping thread 25 is urged towards the needle eye 8 forcing the needle jaw blade assembly major projection inner surface paw 4 and the needle jaw blade assembly minor projection inner surface paw 6 to separate from each other which is facilitated by the resiliency of the needle jaw blade assembly 3.5.

Subsequently, the end of the remaining portion of the wrapping thread 25 is positioned within the needle eye 8.

Subsequently, after a 0.8 second delay, the plier solenoid 49 is automatically activated.

Simultaneously, the plier arrangement 24 assumes the "GRIP POSITION".

Simultaneously, the plier jaw 48 grasps the wrapping thread 25.

Subsequently, after another 0.4 second delay, the needle solenoid 31A is automatically activated.

Simultaneously, the needle arrangement 31 assumes the "NEEDLE FULLY RETRACTED POSITION".

Simultaneously, the cutter solenoid 52 is automatically activated.

Simultaneously, the cutter arrangement 26 assumes the "CUTTING POSITION".

Simultaneously, the blade portion 26A cuts the wrapping thread 25.

Simultaneously, the needle 1 escapes from the remaining portion of the wrapping thread 25.

Simultaneously, the needle 1 pulls the end of the remaining portion of the wrapping thread 25 between the wraps and the fishing rod 13.

Subsequently, the remaining portion of the wrapping thread 25 is automatically tied in the final knot.

Simultaneously, the eyelet 15 is securely fastened to the fishing rod 13.

Subsequently, the end of the remaining portion of the wrapping thread end 25 is automatically removed from the needle eye 8.

Simultaneously, the plier 46 has the end of the cut wrapping thread 25 in the plier jaws 48 ready for the next operation.

Subsequently, when another 0.4 seconds has elapsed, the cutter solenoid 52 is automatically activated and the cutter arrangement 26 assumes the "RETRACTED POSITION".

Subsequently, the table motor 16F is automatically switched to "HIGH SPEED" and "REVERSE".

Subsequently, the table motor 16F is turned on.

Simultaneously, the table 16 returns back to the "TABLE HOME POSITION".

Subsequently, the clamp solenoid 40 is activated.

Simultaneously, and the clamp arrangement 20 assumes the "CLAMPED POSITION".

Subsequently, the fishing rod 13 is removed from the clamp arrangement 20.

Figures 15, 16, 17:
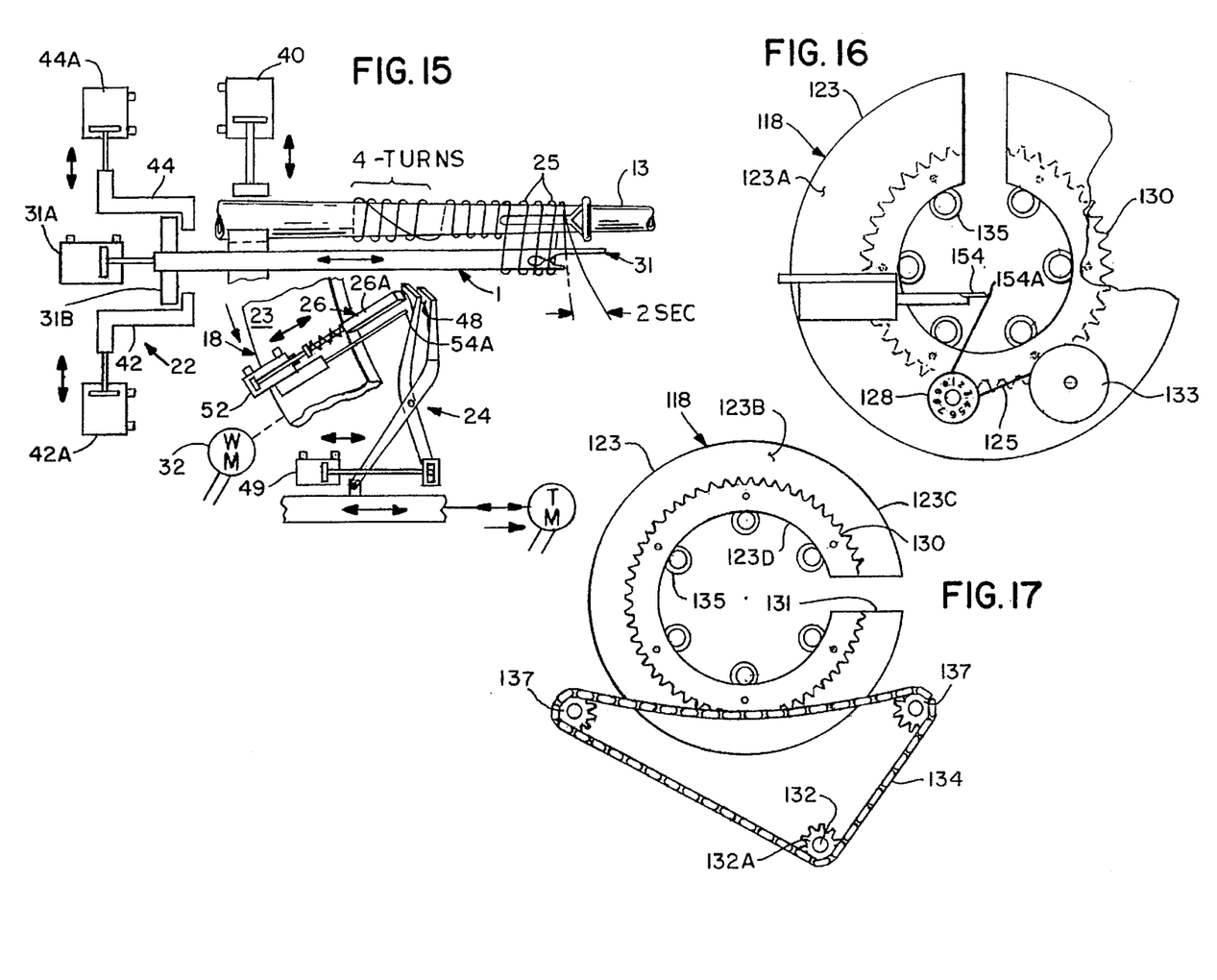
FIG. 15 is a diagrammatic perspective view illustrating the relationship between the various air cylinders, motors and mechanism of a typical winding station.
FIG. 16 is a diagrammatic perspective view of a first side of a modified rotational torus having a radial split therein.
FIG. 17 is a diagrammatic perspective view of a second side thereof.

The configuration of an alternate embodiment of the winder arrangement 118 can best be seen in FIGS. 16 and 17, and as such will be discussed with reference thereto.

The winder arrangement 118 includes a torus 123 that is rotatably mounted to the table (not shown). The torus 123 has a torus front face 123A, a torus back face 123B, a torus perimeter 123C, and contains a torus center opening 123D. A slot 131 is contained through the torus 123 extending from the torus perimeter 123C and opening into the torus center opening 123D. The presence of the slot 131 allows the fishing rod to be loaded from the top of the wrapping device 10 and not longitudinally.

Disposed on the torus front face 123A is a thread spool 133 and a tensioner 128. Thread 125 emanates from the thread spool 133 and passes around the tensioner 128. The tensioner 128 eliminates slack in the thread 125 during the winding operation. Fixedly attached on the torus back face 123B and coaxial therewith is a sprocket gear 130.

A winding motor 132 which has a "LOW SPEED" of 10 rpm and a "HIGH SPEED" of 200 rpm is fixedly attached to the table and disposed to below the torus 123. A winder motor sprocket gear 132A is attached to a shaft extending from the winder motor 132. A pair of winder idler sprocket gears 137 are disposed along side the sprocket gear 130. A winder sprocket chain 134 connects the winder motor sprocket gear 132A, the pair of winder idler sprocket gears 137, and the winder sprocket gear 130 allowing the torus 123 to rotate when the winder motor 132 is activated.

The positioning of the pair of winder idler sprocket gears 137 allow the winder sprocket chain 134 to traverse the slot 131 without becoming disconnected from the winder sprocket gear 130. A plurality of bearings 135 are disposed at the winder center opening 123D and support the winder sprocket key 130. A guide needle 154 having a guide needle eye 154A is attached to and extends inwardly from the torus 123. The thread 125 passes through the guide needle eye 154A.

It will be understood that each of the elements described above, or two or more together, may also find a useful application in other types of constructions differing from the types described above.

While the invention has been illustrated and described as embodied in a winding device for a fishing rod, it is not intended to be limited to the details shown, since it will be understood that various omissions, substitutions and changes in the forms and details of the device illustrated and in its operation can be made by those skilled in the art without departing in any way from the spirit of the present invention.

Without further analysis, the foregoing will so fully reveal the gist of the invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims:

1. A fishing rod wrapping device, comprising:
   a) a frame having a frame top, a frame bottom, and a frame track with a frame track longitudinal axis; said frame further having a pair of spaced apart table male threaded rods being fixedly attached to said frame;
   b) a table being movably mounted to said frame track; said table having a table top plate positioned on said frame top; said table further having a table bottom plate positioned on said frame bottom; said table top plate and said table bottom plate being connected to each other by a pair of spaced apart table guides being positioned within said frame; each of said pair of table guides rotatably containing a bearing with bearing female threaded inner race; each of said pair of spaced apart table male threaded rods passing through said each of said pair of table guides and being rotatably received within said each of said pair of table guides by said bearing; said each of said pair of male threaded rod meshing with each of said bearing female threaded inner races, so that when said pair of bearings rotate, said bearings thread along said pair of table male threaded rods and move said table in the direction of said frame longitudinal axis; said table further having a pair of guide sprocket gears each of which being fixedly attached to each of said bearings and rotating therewith; said table further having a table motor being fixedly attached to said table bottom plate and having a table motor sprocket gear attached thereto and turning therewith; said table further having a table chain connecting said table motor sprocket gear to a pair of table rod sprocket gears, so that said bearings rotate when said table motor is activated;
   c) a winder arrangement being mounted to said table;
   d) a rod clamp arrangement being mounted to said table and disposed behind said winder arrangement;
   e) a blocker arrangement being mounted to said table and disposed behind said winder arrangement;
   f) a plier arrangement being mounted to said table and disposed in front of said winder arrangement;
   g) a cutter arrangement being mounted to said table and disposed in front of said winder arrangement;
   h) a needle arrangement being mounted to said winder arrangement and passable through said winder arrangement; and
   i) a micro programmable controller being disposed within said frame.

2. The device as defined in claim 1, wherein said winder arrangement has a torus with a torus front face and a torus back face, said torus is rotatably mounted to said table.

3. The device as defined in claim 2, wherein said winder arrangement further has a thread spool and a tensioner disposed on said torus front face so that thread emanating from said thread spool passes around said tensioner and is free of slack during a winding operation.

4. The device as defined in claim 3, wherein said winder arrangement further has a winder pulley that is fixedly attached to said torus back face and coaxial therewith.

5. The device as defined in claim 4, wherein said winder arrangement further has a winding motor that is fixedly attached to said table and disposed to the side of said torus.

6. The device as defined in claim 5, wherein said winder arrangement further includes a winder motor pulley that is fixedly attached to said winder motor and turns therewith.

7. The device as defined in claim 6, wherein said winder further has a winder belt that connects said winder motor pulley to said winder pulley so that said torus rotates when said winder motor is activated.

8. The device as defined in claim 7, wherein said winder arrangement further has a proximity sensor that is fixedly attached to said table and a torus plate that is fixedly attached to said torus; said proximity sensor in conjunction with said torus plate function to count the number of revolutions of said torus so that each time said torus plate revolves past said proximity sensor another revolution is counted.

9. The device as defined in claim 8, wherein said winder arrangement further has a guide needle with a guide needle eye so that said thread passes through said guide needle eye, said guide needle is fixedly attached to and extends inwardly from said torus.

10. The device as defined in claim 1, wherein said rod clamp arrangement has a lower chuck which is fixedly attached to said table.

11. The device as defined in claim 10, wherein said lower chuck has a lower chuck upper surface that contains a substantially "V"-shaped recess so that a fishing rod is cradled therein.

12. The device as defined in claim 11, wherein said rod clamp arrangement further has a clamp solenoid that is disposed above said lower chuck and is fixedly attached to said table so that said fishing rod is secured within said recess.

13. The device as defined in claim 1, wherein said blocker arrangement has a lower blocker which is movably mounted to said table.

14. The device as defined in claim 13, wherein said blocker arrangement further has an upper blocker which is movably mounted to said table.

15. The device as defined in claim 14, wherein said blocker arrangement further has a lower blocker solenoid that is fixedly attached to said table and communicates with said lower blocker.

16. The device as defined in claim 15, wherein said blocker arrangement further has an upper blocker solenoid that is fixedly attached to said table and communicates with said upper blocker.

17. The device as defined in claim 1, wherein said plier arrangment has a plier with a plier first leg that is fixedly attached to said table, plier second leg that is movable relative to said plier first leg and a plier jaw that extends substantially perpendicular to said plier first leg and said plier second leg and towards said winder arrangement.

18. The device as defined in claim 17, wherein said plier arrangment further has a plier solenoid that is fixedly attache to said table and pivotally communicates with said plier second leg.

19. The device as defined in claim 1, wherein said cutter arrangement has a stationary portion that is fixedly attached to said table and a blade portion that is movably mounted to said stationary portion.

20. The device as defined in claim 19, wherein said cutter arrangement further has a plurality of adjusting screws so that said cutter arrangement is precisely positioned for accurate cutting of said wrapping thread.

21. The device as defined in claim 20, wherein said cutter arrangement further has a cutter solenoid that is fixedly attached to said table to a side of and in alignment with said blade portion.

22. The device as defined in claim 1, wherein said needle arrangement has a needle solenoid that is fixedly attached to said table, a fishing rod wrapping device needle that is movably mounted to said needle solenoid that has a needle fixed end, and a needle stop that is disposed on said needle fixed end and releasably engageable with said blocker arrangement.

23. The device as defined in claim 1, wherein said micro programmable controller is attached to said frame by a fastener selected from a group consisting of snaps and screws.

24. The device as defined in claim 23, wherein said micro programmable controller utilizes a single cable for all of at least 6 inputs into said micro programmable controller and a keypad for at least 14 outputs out of said micro programmable controller.

25. The device as defined in claim 24, wherein said at least 6 inputs include a needle override to override the needle arrangement, a plier override to override the plier arrangement, a table proximity switch, a counter proximity switch, a stop, and a start.

26. The device as defined in claim 25, wherein said at least 14 outputs include outputs that operate wind motor relays which ultimately cause said winding arrangement to achieve a fast speed of 200 rpm and a slow speed of 10 rpm, outputs that operate table motor relays which ultimately cause said table to move forward at 10 rpm and move in reverse at 37 rpm, outputs that operate said plier arrangement, outputs that operate said needle arrangement, outputs that operate said blocking arrangement, outputs that operate said cutter arrangement, and outputs that operate said clamp arrangement.

27. The device as defined in claim 26, wherein said micro programmable controller further has a built-in EEPROM memory for storing programs.

28. The device as defined in claim 27, wherein said micro programmable controller further has a small hand held program loader key pad that uses conventional relay symbol format so that adjustment of parameters for different fishing rods is facilitated.

29. The device as defined in claim 28, wherein said micro programmable controller is operated by a 24 V DC built in power supply so that an external power supply is not needed.

30. The device as defined in claim 1, wherein said micro programmable controller is two programmable logic controllers.

31. The device as defined in claim 1, wherein said winder arrangement has a torus with a torus front face, a torus back face, a torus outer perimeter, and a torus slot that passes completely through said torus and extends from said torus outer perimeter to said torus central opening so that a fishing rod is loaded into said winder arrangement from overhead, said torus is rotatably mounted to said table.

32. The device as defined in claim 31, wherein said winder arrangement further has a thread spool and a tensioner disposed on said torus front face so that thread emanating from said thread spool passes around said tensioner and is free of slack during a winding operation.

33. The device as defined in claim 32, wherein said winder arrangement further has a winder sprocket gear that is fixedly attached to said torus back face and coaxial therewith.

34. The device as defined in claim 33, wherein said winder arrangement further has a winding motor fixedly attached to said table and positioned to the side of said torus.

35. The device as defined in claim 34, wherein said winder arrangement further includes a motor sprocket gear that is fixedly attached to said winder motor and turns therewith and a winder idler sprocket gear that is rotatably attached to said table and positioned a distance to side of said motor sprocket gear.

36. The device as defined in claim 35, wherein said winder arrangement further has a winder chain that connects said winder motor sprocket gear to said winder idler sprocket gear to said winder sprocket gear so that said torus rotates when said winder motor is activated.

37. The device as defined in claim 36, wherein said winder arrangement further has a proximity sensor that is fixedly attached to said table and a torus plate that is fixedly attached to said torus, said proximity sensor in conjunction with said torus plate function to count the number of revolutions of said torus.

38. The device as defined in claim 37, wherein said winder arrangement further has a guide needle with a guide needle eye that said thread passes through said guide needle eye, said guide needle is fixedly attached to and extends inwardly from said torus.

39. A method of using a fishing rod wrapping device wherein said fishing rod wrapping device includes a frame, a table, a winder arrangement, a rod clamp arrangement, a blocker arrangement, a plier arrangement, a cutter arrangement, a needle arrangement, and a micro programmable controller, comprising the steps of:

a) assuring that said fishing rod wrapping device is in an initial position;

b) threading manually a loose end of an initial portion of a wrapping thread through a guide needle eye of said winder arrangement;

c) positioning manually said loose end of said initial portion of said wrapping thread intermediate plier jaws of said plier arrangement;

d) activating a plier solenoid of said plier arrangement so that said plier arrangement automatically assumes a closed position and said plier jaws grasp said loose end of said initial portion of said wrapping thread;

e) positioning manually a fishing rod in said clamp arrangement;

f) activating a clamp solenoid of said clamp arrangement so that said clamp arrangement automatically assumes a closed position and said fishing rod is automatically retained in said clamp arrangement;

g) setting a winder motor of said winder arrangement to a high speed;

h) setting a table motor of said table to a forward slow speed;

i) depressing manually a start button so that said winder motor is activated and said table motor is activated and a proximity sensor of said winder arrangement is automatically activated and a wind count begins;

j) wrapping automatically said initial portion of said wrapping thread around said fishing rod at a position adjacent to where an eyelet has been adhered;

k) ceasing automatically rotation of said table motor when said wind count is 3;

l) resuming automatically rotation of said table motor when said wind count is 5;

m) activating automatically a plier solenoid of said plier arrangement when said wind count is 11 so that said plier arrangement assumes an open position;

n) trapping automatically said loose end of said initial portion of said wrapping thread under subsequent wraps so that said initial portion of said wrapping thread is tied in an initial knot;

o) moving automatically a winder thread guide of said winder arrangement 90 degrees passed a winder home position of said winder arrangement when 0.1 second has elapsed after said wind count has reached 15 so that said needle guide becomes free of said needle arrangement;

p) activating automatically a blocking upper solenoid and a blocking lower solenoid of said blocking arrangement so that said blocking arrangement assumes a blocking position;

q) activating automatically a needle solenoid of said needle arrangement so that said needle arrangement assumes a partially extended position wherein a needle of said needle arrangement is automatically positioned adjacent to said fishing rod with a needle jaw blade assembly of said needle arrangement positioned in an area of a base of said adhered eyelet and a torus of said winder arrangement continues to rotate automatically pressing said needle tightly against said fishing rod while remaining wraps automatically overlap said needle;

r) resuming automatically said winder motor to a low speed when said wind count equals the total number of wraps minus 2;

s) ceasing automatically rotation of said winder motor at said winder home position when said wind count equals the total number of wraps and said table motor continues to rotate so that said wrapping thread is automatically pulled into position for said needle;

t) activating automatically said upper blocking solenoid and said lower blocking solenoid two seconds after said table motor stops so that said blocking arrangement assumes an open position;

u) activating automatically said needle solenoid so that said needle arrangement assumes a fully extended position;

v) wrapping a remaining portion of said wrapping thread around both said eyelet and said needle jaw blade assembly;

w) sliding an end of a remaining portion of said wrapping thread inward along a needle slot of said needle jaw blade assembly to a junction of a needle jaw blade assembly major projection inner surface paw and a needle jaw blade assembly minor projection inner surface paw of said needle jaw blade assembly;

x) urging said remaining portion towards a needle eye of said needle jaw blade assembly forcing said needle jaw blade assembly major projection inner surface paw and said needle jaw blade assembly minor projection inner surface paw to separate from each other so that an end of said remaining portion is positioned within said needle eye;

y) activating automatically said plier solenoid after a 0.8 second delay so that said plier arrangement assumes a grip position and plier jaws of said plier arrangement grasps said wrapping thread;

z) activating automatically said needle solenoid after another 0.4 second delay so that said needle arrangement assumes a fully retracted position and a cutter solenoid of said cutter arrangement is automatically activated so that said cutter arrangement assumes a cutting position and a blade portion of said cutter arrangement cuts said wrapping thread and said needle escapes from said remaining portion of said wrapping thread and said needle pulls said end of said remaining portion between wraps and said fishing rod;

aa) tying automatically said remaining portion in a final knot so that said eyelet is securely fastened to said fishing rod;

bb) removing automatically said end of said remaining portion from said needle eye and said plier jaws grasps an end of said wrapping thread that is remaining on a thread spool of said winder arrangement;

cc) activating automatically said cutter solenoid when another 0.4 seconds has elapsed so that said cutter arrangement assumes a retracted position;

dd) switching automatically said table motor to high speed and reverse;

ee) turning on automatically said table motor so that said table returns back to a table home position;

ff) activating automatically said clamp solenoid so that said clamp arrangement assumes an open position; and gg) removing manually said fishing rod from said clamp arrangement.

40. The method as defined in claim 39, wherein said initial position includes said needle arrangement is in a fully retracted position, said blocking arrangement is in said blocking position, said table is in said table home position, said winder arrangement is in said winder home position, said plier arrangement is in said plier open position, and said clamp arrangement is in said clamped position.

* * * * *